United States Patent [19]

Nowack et al.

[11] Patent Number: 5,373,525
[45] Date of Patent: Dec. 13, 1994

[54] WAVE GUIDE LASER HAVING A RESONATOR MIRROR WITH SUCCESSIVE REFLECTING SEGMENTS AND OUT COUPLING OPENINGS ARRANGED IN AN AZIMUTHAL DIRECTION

[75] Inventors: Rolf Nowack, Leonberg; Hans Opower, Krailling, both of Germany

[73] Assignee: Deutsche Forschungsanstalt fuer Luft- und Raumfahrt e.V., Bonn, Germany

[21] Appl. No.: 10,830

[22] Filed: Jan. 29, 1993

[30] Foreign Application Priority Data

Feb. 5, 1992 [DE] Germany ............... 4203225

[51] Int. Cl.⁵ ................. H01S 3/08
[52] U.S. Cl. ................. 372/64; 372/68; 372/94; 372/99; 372/102
[58] Field of Search ........... 372/92, 95, 99, 94, 372/102, 101, 64, 55, 66, 72, 67, 68

[56] References Cited

U.S. PATENT DOCUMENTS

| | | | |
|---|---|---|---|
| 4,050,036 | 9/1977 | Chambers et al. | 372/95 |
| 4,446,559 | 5/1984 | von Bieren | 372/95 |
| 4,751,716 | 6/1988 | Ream et al. | 372/72 |
| 4,780,882 | 10/1988 | Nir | 372/95 |
| 4,813,052 | 3/1989 | DeMaria et al. | 372/64 |
| 4,884,282 | 11/1989 | Bridges | 372/64 X |
| 4,961,201 | 10/1990 | Opower | 372/94 |
| 5,099,492 | 3/1992 | Zajdman et al. | 372/99 |

FOREIGN PATENT DOCUMENTS 0339128 11/1989 European Pat. Off. .
4123024 1/1992 Germany .

OTHER PUBLICATIONS

Xin et al, "Compact, Multipass, Single Transverse Mode CO₂ Laser", Appl. Phys. Lett., vol. 51, No. 7, Aug. 1987, pp. 469–471.
Edmonds, "The Reflaxicon, a New Reflective Optical Element, and Some Applications," *Applied Optics,* vol. 12, No. 8, Aug., 1973, pp. 1940–1944.

*Primary Examiner*—Rodney B. Bovernick
*Assistant Examiner*—Hemang Sanghavi
*Attorney, Agent, or Firm*—Barry R. Lipsitz

[57] ABSTRACT

In order to improve a wave guide laser comprising a wave guide arranged between two resonator mirrors and having an outer cylindrical wave guide surface and an inner cylindrical wave guide surface facing the outer surface and arranged within this outer surface in spaced relation thereto, the two surfaces together forming a wave guide having a radiation coherent in the entire wave guide and essentially expanding in axial direction, and a high-frequency excited and diffusion-cooled laser gas arranged between the wave guide surfaces, such that the high-power Laser beam can be outcoupled by an element which is constructionally simple to produce and inexpensive, it is suggested that the second resonator mirror be composed in azimuthal direction of a plurality of successive reflecting segments, that outcoupling openings for the laser radiation to be outcoupled be provided between the respective reflecting segments and that the entire radiation expanding in the wave guide be diffraction-coupled in azimuthal direction.

23 Claims, 3 Drawing Sheets

WAVE GUIDE LASER HAVING A RESONATOR MIRROR WITH SUCCESSIVE REFLECTING SEGMENTS AND OUT COUPLING OPENINGS ARRANGED IN AN AZIMUTHAL DIRECTION

BACKGROUND OF THE INVENTION

The invention relates to a wave guide laser comprising a wave guide arranged between two resonator mirrors and having an outer cylindrical wave guide surface and an inner cylindrical wave guide surface facing the outer surface and arranged within this outer surface in spaced relation thereto, the two surfaces together forming a wave guide having a radiation coherent in the entire wave guide and essentially expanding in axial direction, and a high-frequency excited and diffusion-cooled laser gas arranged between the wave guide surfaces.

Wave guide lasers of this type—in particular diffusion-cooled $CO_2$ lasers—are known, for example, from DE-PS 27 35 299.

In order to be able to produce lasers for high capacities, in particular for capacities $>10$ kw, from wave guide lasers of this type, the diameters of the cylindrical wave guide surfaces are to be selected in the order of $>20$ cm so that a large diameter also results for the resonator mirrors. This results in great difficulties, particularly with a view to the design of the outcoupling mirrors, since transmissive materials for such large mirrors are no longer economical in their use.

The object underlying the invention is, therefore, to improve a wave guide laser of the generic type such that the high-power laser beam can be outcoupled by an element which is constructionally simple to produce and inexpensive.

SUMMARY OF THE INVENTION

This object is accomplished in accordance with the invention, for a wave guide laser of the type described at the outset, in that the second resonator mirror is composed in azimuthal direction of a plurality of successive reflecting segments, that outcoupling openings for the laser radiation to be outcoupled are provided between the respective reflecting segments and that the entire radiation expanding in the wave guide is diffraction-coupled in azimuthal direction, The inventive solution creates, on the one hand, the possibility of outcoupling the laser radiation out of the wave guide in a simple manner and, on the other hand, of maintaining the coherence throughout the entire wave guide, in particular in the azimuthal direction thereof, due to the diffraction coupling.

Within the scope of the inventive solution, the diffraction coupling could be attainable by means of a diffraction element in the wave guide or by one of the resonator mirrors. It is, however, particularly favourable for the reflecting segments to effect the diffraction coupling due to their dimensioning in azimuthal direction.

In this respect, it is particularly expedient for the reflecting segments to form a diffraction grating effecting the diffraction coupling.

In the simplest case, this can be realized in that the reflecting segments and the outcoupling openings alternate periodically with one another.

It is, in particular, advantageous for all the reflecting segments to have the same width in azimuthal direction.

Moreover, it is also advantageous for all the outcoupling openings to have the same width in azimuthal direction.

The reflecting segments are preferably designed such that they extend in radial direction, in relation to the cylinder axis, over a distance between the wave guide surfaces.

In the same way, it is preferable for the outcoupling openings to extend in radial direction over the distance between the wave guide surfaces.

The reflecting segments can for their part, be limited by the most varied side edges. For example, it would be conceivable to design the reflecting segments as circular mirrors or the outcoupling openings as circular holes between the reflecting segments.

However, it is particularly advantageous for the reflecting segments to have side edges extending at right angles to the wave guide surfaces. In the case of a circular cylinder, it is preferable for the side edges to be aligned in radial direction relative to the cylinder axis.

The reflecting segments are preferably designed such that they reflect the laser radiation essentially completely.

The diffraction coupling in azimuthal direction mentioned at the outset can already be attained when at least the radiation impinging on reflecting segments located next to one another is coupled by diffraction.

An average width of the reflecting segments in azimuthal direction preferably results from the following formula $$2L \times \frac{\lambda}{br} \geqq ba + br,$$

where L is the length of the wave guide, $\lambda$ is the wavelength of the laser light, br is the average width of the reflecting segment and ba is the average width of the outcoupling opening.

In addition, the following formula preferably results for an average width of the outcoupling openings in azimuthal direction $$2A > ba > \tfrac{1}{2}A,$$

where ba is the average width of the outcoupling opening and A the distance between the wave guide surfaces.

Finally, the average width of the reflecting segments and the average width of the outcoupling openings are interrelated, whereby the following formula preferably results for $CO_2$ lasers $$\frac{ba}{br} \sim 0.5 \text{ to } 1.$$

In a particularly advantageous constructional solution, a bundle of laser beams exiting from the second resonator mirror is converted by an optical means constricting a beam in radial direction to form a bundle of laser beams having a smaller diameter.

This optical means constricting a beam in radial direction is preferably designed as an axicon.

In a particularly advantageous solution of an axicon, this has toroidal surfaces as reflecting surfaces since this results in an expansion of the laser beam impinging on the inner mirror surfaces and, therefore, a reduction in the load thereon.

In addition, in an advantageous constructional solution, the outer cylindrical wave guide surfaces and the inner cylindrical wave guide surfaces are each surfaces of a cylindrical, whereby these cylinders are preferably metal cylinders and represent the electrodes for the high-frequency discharge.

In order to keep the wave guide surfaces at a defined distance from one another, the walls bearing the wave guide surfaces are preferably fixed in position relative to one another by holders extending in radial direction in the region of the reflecting segments between the outcoupling openings. This means that it is possible to fix the walls in position relative to one another in radial direction in the region of the second resonator mirror.

The holders preferably engage over the reflecting segments on their side remote from the wave guide.

Within the scope of the explanations concerning various embodiments no details have been given regarding the design the reflecting mirror surfaces.

It would, for example, be possible to curve the reflecting mirror surfaces slightly concavely in radial direction.

In a particularly advantageous embodiment, however, the first resonator mirror has a plane reflecting mirror surface.

Moreover, in a simple; embodiment which is, therefore, expensive to produce, the second resonator mirror has plane reflecting surfaces.

In a somewhat mollified embodiment, the coupling in azimuthal direction can be further improved by the second resonator having reflecting surfaces which are curved slightly convexly in azimuthal direction.

The reflecting surfaces are preferably aligned such that they extend parallel to the radial direction.

This construction can be developed even more advantageously when the holders bear the reflecting segments, over which they engage, so that it is possible at the same time to fix the reflecting segments in position relative to the cylinders bearing the wave guide surfaces.

Additional features and advantages of the inventive solution are the subject matter of the following description as well as the drawings of one embodiment.

DESCRIPTION OF THE PREFERRED EMBODIMENTS

Figure 1:
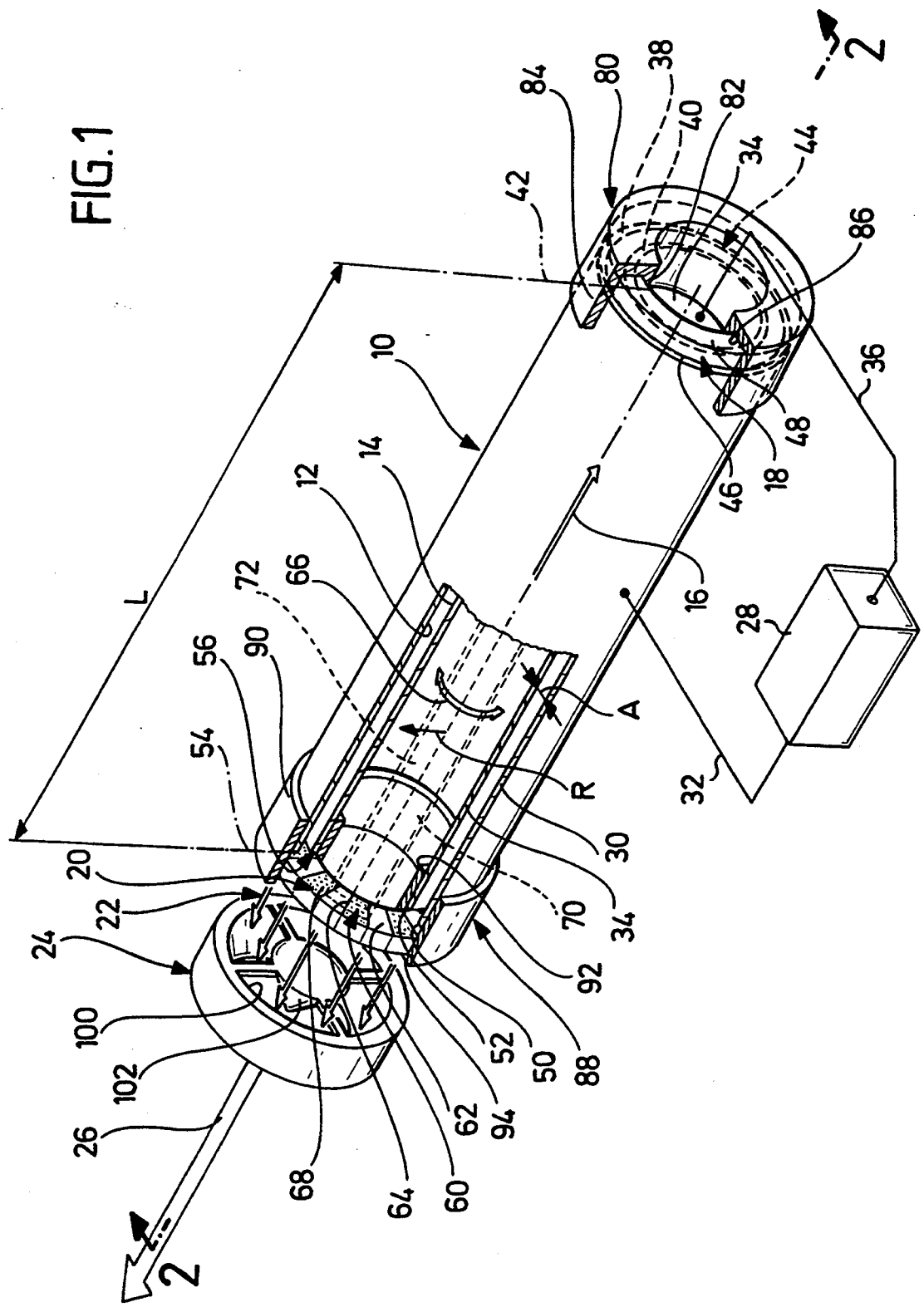
FIG. 1 shows a perspective view of an inventive laser.

An embodiment illustrated in FIG. 1 of an inventive laser comprises a wave guide designated as a whole as 10, formed by an outer cylindrical wave guide surface 12 and an inner cylindrical wave guide surface 14, the two surfaces being arranged coaxially to a cylinder axis 16.

This cylindrical optical wave guide serves to guide laser radiation by reflection back and forth essentially in the direction of the cylinder axis 16 between a first resonator mirror 18 and a second resonator mirror 20 of a laser resonator, which are each arranged at an end face of the wave guide 10.

The first resonator mirror 18 is fully reflecting whereas the second resonator mirror 20 represents an outcoupling mirror, out of which a bundle 22 of laser beams exits in the shape of a cylinder around the cylinder axis 16. This bundle of laser beams is brought together by an axicon 24 to form a bundle 26 of laser beams which is coaxial to the cylinder axis 16 and has a smaller diameter than the bundle 22 of laser beams.

A high-frequency source 28 serves to excite laser gas, preferably $CO_2$ at the pressure customary for $CO_2$, arranged in the wave guide 10. This high-frequency source results in the wave guide 10 in a gas discharge in radial direction relative to the cylinder axis 16 due to suitable electrode arrangements. The laser gas is not thereby circulated but cooled merely by impact on the cooled wave guide surfaces 12 and 14.

Figure 2:
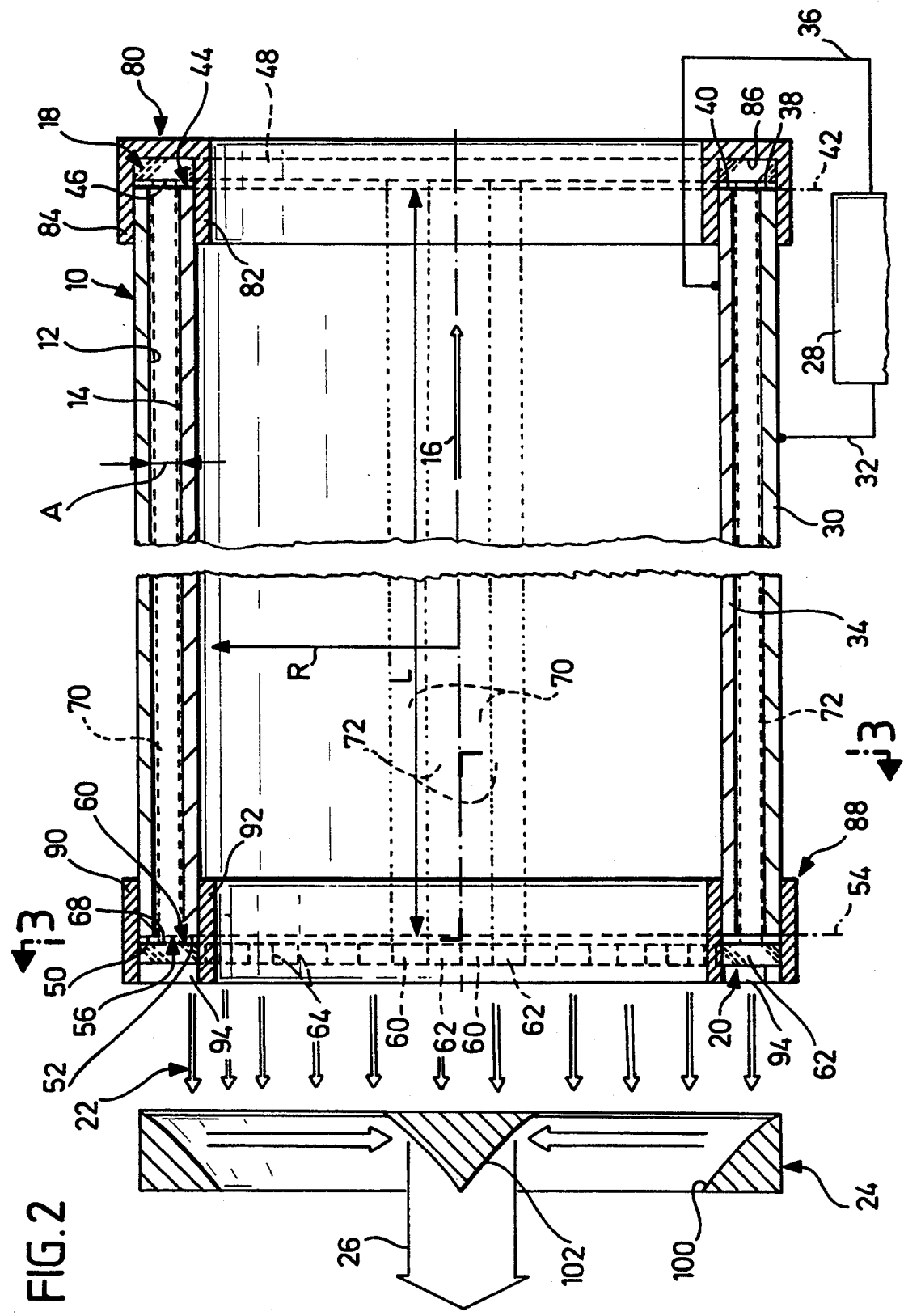
FIG. 2 shows a section along line 2—2 in FIG. 1.

As illustrated in detail in FIG. 2, the outer wave guide surface 12 is borne by an outer cylinder wall 30, which preferably represents the wall of a metal cylinder which is connected to the high-frequency source 28 directly via a line 32 and serves as outer electrode.

Similarly, the inner wave guide surface 14 is borne by an inner cylinder wall 34 which is likewise the wall of a metal cylinder connected, for its part, to the high-frequency source 28 via a line 36.

As also illustrated in FIG. 2 in detail, first ends 38 axed 40 of the cylinder walls 30 and 34, respectively, are located in a plane 42 and form a first end face 44 of the wave guide 10.

The first resonator mirror 18 with a ring-shaped reflecting region 46 faces this first end face 44 of the wave guide 10 so that a total reflection of the radiation guided by the wave guide 10 to this end face by reflection back and forth on the cylindrical wave guide surfaces 12 and 14 is on hand at the first end face 44.

Preferably, the first resonator mirror 18 is likewise formed by a ring 48 made of a carrier material which bears the ring-shaped reflecting region.

Second ends 50 and 52 of the outer cylinder wall 30 and the inner cylinder wall 34, respectively, are located opposite to the respective first ends and likewise arranged in a plane 54, in which a second end face 56 of the wave guide 10 is located.

Figure 3:
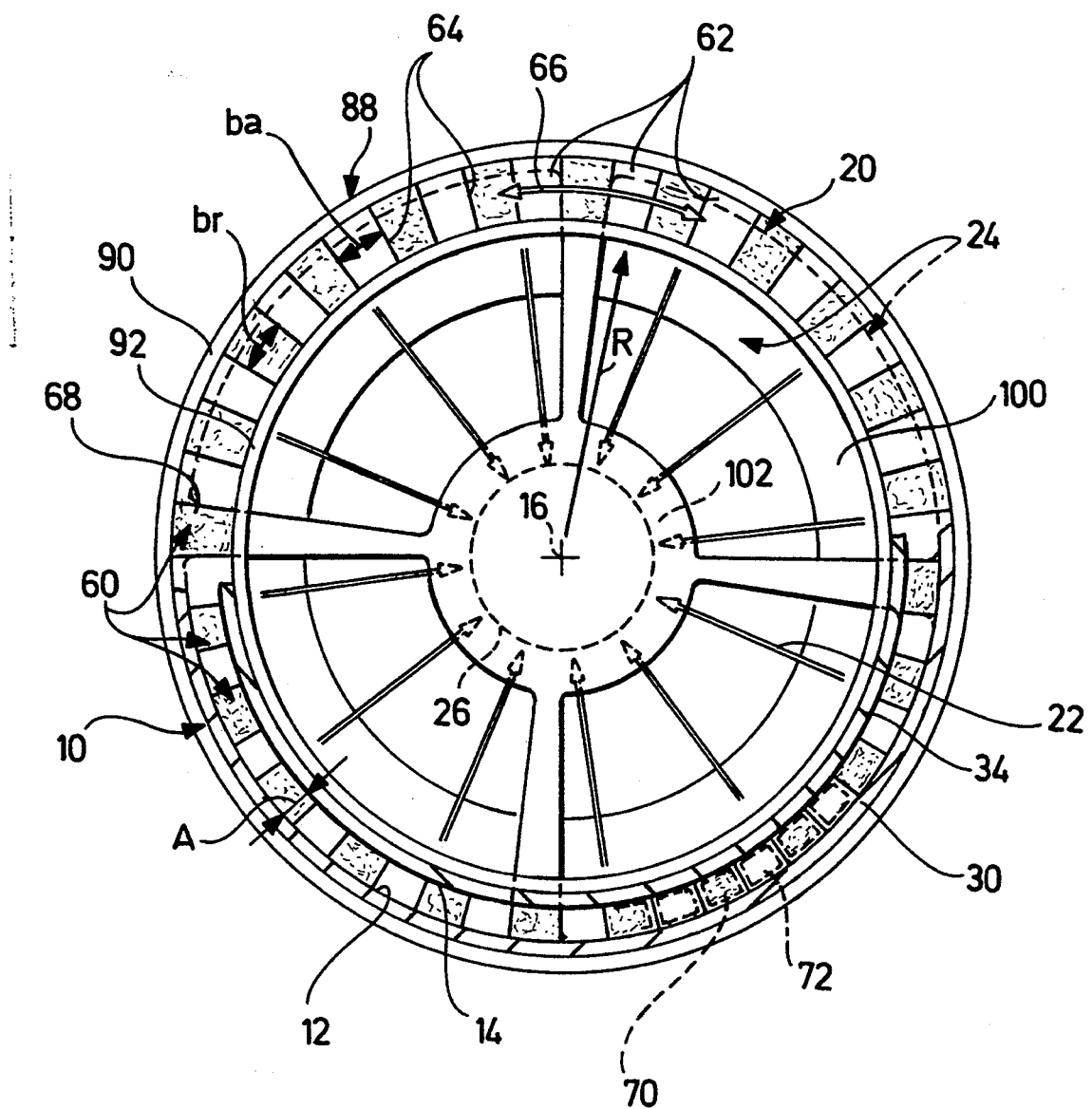
FIG. 3 shows a section along line 3—3 in FIG. 2.

As already described, the second resonator mirror 20 is arranged facing this second end face and, as illustrated in particular in FIG. 3, comprises a plurality of reflecting segments 60, which have outcoupling openings 62 arranged between them. These outcoupling openings extend in radial direction R relative to the cylinder axis 16 over the distance A between the cylindrical wave guide surfaces 12 and 14.

The reflecting segments 60 are preferably circular ring segments in relation to the cylinder axis 16, whereby the outcoupling openings 62 likewise represent circular ring segments so that edges 64 of the reflecting segments extend in radial direction R relative to the cylinder axis 16.

The reflecting segments 60 have a width br while the outcoupling openings each have a width ba, whereby width br or ba is to be understood as the respective average width of the circular segments in azimuthal direction 66 in relation to the cylinder axis 16.

The reflecting segments 60 have reflection surfaces 68 facing the second end face 56 of the wave guide 10 and these reflection surfaces extend in azimuthal direction 60 between their edges 64 and in radial direction R between the outer and inner cylindrical wave guide surfaces 12 and 14.

The reflection surfaces 68 are hereby parallel to the plane 54 which extends, according to the invention, at right angles to the cylinder axis 16.

Moreover, the ring-shaped reflecting region 46 of the first resonator mirror 18 also extends parallel to the plane 42 which is likewise at right angles to the cylinder axis 16.

The entire wave guide 10 is therefore divided by the two mirrors 18 and 20 into strip-like regions 70, which are closed at their ends by fully reflecting mirror surfaces, namely the reflecting region 46 and the reflecting surfaces 68, as well as into strip-like regions 72 which are located adjacent thereto and are closed so as to be fully reflecting only on one side, namely by the reflecting region 46, and are open on their other side due to the outcoupling openings 62.

In order to couple all the strip-Like regions 70 and 72 coherently with one another, the width of the reflecting surfaces 68 is selected such that, due to the phenomena of diffraction at the reflecting surfaces 68, adjoining strip-like regions 70 and, therefore, also the strip-like regions 72 located between them are coupled with one another by diffraction.

This means that the width of the reflecting surfaces 68 is in the order of, for example, one or more millimeters in the case, for example, of a $CO_2$ laser having a length L of the wave guide 10 of more than one meter.

The reflecting surfaces 68 therefore form an annular diffraction grating which is responsible for a complete coupling of the strip-like regions 70 and 72 in azimuthal direction 66 over the entire wave guide 10.

The width ba of the outcoupling openings 62 is preferably selected such that it is approximately equal to the width br when the wave guide 10 is of a long length, for example lengths of approximately 1.5 meters, and amounts, for example, to ⅔ br in the case of shorter lengths, approximately of 1 meter.

Moreover, it should be taken into consideration for the width ba that the laser beams in the bundle 22 of laser beams passing through the outcoupling openings 62 are not diffracted to any essentially greater extent in azimuthal direction 66 than in radial direction R so that the width ba is to be selected approximately equal to or larger than the distance A between the cylindrical wave guide surfaces 12 and 14.

In order to position the outer cylinder wall 30 and the inner cylinder wall 34 at the distance A from one another in a defined and stable manner in the inventive solution, a holder ring 80 is provided at the first end face and this holder ring serves with an inner shoulder 82 as inner abutment for the inner cylinder wall 34 and with an outer shoulder 84 as outer abutment for the outer cylinder wall 30. In addition, the holder ring 80 bears the first resonator mirror 18 in a recess 86 provided herefor.

At their second ends 50 and 52 the cylinder walls 30 and 34 are fixed in position relative to one another by U-shaped holders 88, whereby the holders 88 are connected with their side arms 90 and 92 to outer sides and inner sides, respectively, of the cylinder walls 30 and 34, respectively, and with a center arm 94 engage each time over the rear side of a reflecting segment 60 remote from its reflection surface 68.

The holders 88 are also preferably designed as support elements for fixing the reflecting segments 60 in position and therefore hold these with their reflection surfaces 68 parallel to the plane 54.

The axicon 24 converting the bundle 22 of laser beams into the bundle 26 of laser beams preferably comprises an outer convex toroidal surface 100 which is arranged coaxially to the cylinder axis 16 and an inner concave toroidal surface 102 which is Likewise arranged coaxially to the cylinder axis 16.

We claim:
1. A wave guide laser comprising:
a wave guide having:
an outer cylindrical wave guide surface extending parallel to an axis of said wave guide, and
an inner cylindrical wave guide surface facing said outer wave guide surface and arranged within said outer wave guide surface in spaced relation thereto;
a laser gas arranged between said wave guide surfaces and adapted to be excited by high frequency energy and cooled by diffusion; and
two resonator mirrors for defining a laser radiation field, one of said resonator mirrors having a plurality of reflecting segments successively arranged at a common radius and in an azimuthal direction about said wave guide axis with said successive reflecting segments being separated by corresponding outcoupling openings,
said radiation field comprising first radiation field segments extending between said reflecting segments of said one mirror and the other mirror and second radiation field segments extending between said outcoupling openings and said other mirror, said first and second radiation field segments being diffraction-coupled in said azimuthal direction, whereby coherent laser radiation is produced propagating essentially parallel to said axis between said wave guide surfaces.

2. A wave guide laser in accordance with claim 1, wherein the dimensions of said reflecting segments in said azimuthal direction are chosen to effect said diffraction coupling.

3. A wave guide laser in accordance with claim 2 wherein said reflecting segments form a diffraction grating.

4. A wave guide laser in accordance with claim 1 wherein the reflecting segments and the outcoupling openings alternate periodically with one another.

5. A wave guide laser in accordance with claim 1 wherein said reflecting segments all have the same width in said azimuthal direction.

6. A wave guide laser in accordance with claim 1 wherein said outcoupling openings all have the same width in said azimuthal direction.

7. A wave guide laser in accordance with claim 1 wherein the reflecting segments extend in a radial direction relative to said wave guide axis between said inner cylindrical wave guide surface and said outer cylindrical wave guide surface.

8. A wave guide laser in accordance with claim 1 wherein said outcoupling openings extend in a radial direction relative to said wave guide axis between said inner cylindrical wave guide surface and said outer cylindrical wave guide surface.

9. A wave guide laser in accordance with claim 1 wherein said reflecting segments have side edges extending at right angles to said wave guide surfaces.

10. A wave guide laser in accordance with claim 1 wherein said reflecting segments are adapted to substantially totally reflect said laser radiation.

11. A wave guide laser in accordance with claim 1 wherein said reflection segments are positioned such that laser radiation impinging on adjacent ones of said segments is coupled by diffraction.

12. A wave guide laser in accordance with claim 1 wherein an average width (br) of the reflecting segments in said azimuthal direction is defined by the relationship:

$$2L(\lambda/br) \geq ba + br,$$

where L is the length of said wave guide, $\lambda$ is the wavelength of said laser radiation, and ba is an average width of said outcoupling openings.

13. A wave guide laser in accordance with claim 1 wherein an average width (ba) of the outcoupling openings in said azimuthal direction is defined by the relationship:

$$2A \geq ba \geq A/2,$$

where A is a distance between said outer cylindrical wave guide surface and said inner cylindrical wave guide surface.

14. A wave guide laser in accordance with claim 1 wherein an average width (br) of said reflecting segments and an average width (ba) of said outcoupling openings are related by the relationship:

$$(ba/br) \sim 0.5 \text{ to } 1.$$

15. A wave guide laser in accordance with claim 1 further comprising optical means for converting a bundle of laser beams exiting from the outcoupling openings to a smaller diameter.

16. A wave guide laser in accordance with claim 15 wherein said optical means comprise an axicon.

17. A wave guide laser in accordance with claim 16 wherein said axicon has toroidal surfaces as reflecting surfaces.

18. A wave guide laser in accordance with claim 1 wherein said wave guide surfaces comprise walls that are fixed in position relative to one another by holders extending in a radial direction relative to said wave guide axis in a region of said reflecting segments between said outcoupling openings.

19. A wave guide laser in accordance with claim 18 wherein said holders engage over the reflecting segments on a side remote from the wave guide.

20. A wave guide laser in accordance with claim 1 wherein said two resonator mirrors comprise a first mirror and a second mirror, said second mirror being the one having a plurality of reflecting segments separated by corresponding outcoupling openings and the first mirror having a plane reflecting mirror surface.

21. A wave guide laser in accordance with claim 1 wherein said reflecting segments have plane reflecting surfaces.

22. A wave guide laser in accordance with claim 21 wherein said reflecting surfaces extend in parallel to a radial direction of said wave guide axis.

23. A wave guide laser in accordance with claim 1 wherein said reflecting segments have reflecting surfaces that are curved slightly convexly in said azimuthal direction.

* * * * *